US007908177B2

(12) United States Patent
Svendsen et al.

(10) Patent No.: US 7,908,177 B2
(45) Date of Patent: Mar. 15, 2011

(54) METHOD AND SYSTEM FOR SUPPORTING SECURE TRANSACTIONS IN A PEER-TO-PEER NETWORK (75) Inventors: Hugh B. Svendsen, Chapel Hill, NC (US); Christopher M. Amidon, Apex, NC (US); Gary W. Black, Cary, NC (US); Robert P. Morris, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

(21) Appl. No.: 12/501,879

(22) Filed: Jul. 13, 2009

(65) Prior Publication Data
US 2009/0276328 A1    Nov. 5, 2009

Related U.S. Application Data (63) Continuation of application No. 10/954,930, filed on Sep. 30, 2004, now Pat. No. 7,571,119.

(51) Int. Cl.
G06Q 30/00    (2006.01)
(52) U.S. Cl. ....................................................... 705/26
(58) Field of Classification Search .............. 705/26, 705/27
See application file for complete search history.

(56) References Cited

U.S. PATENT DOCUMENTS

| 2002/0007350 | A1* | 1/2002 | Yen ................................. 705/52 |
| 2002/0156917 | A1* | 10/2002 | Nye ............................... 709/238 |
| 2002/0178087 | A1 | 11/2002 | Henderson et al. |
| 2003/0126033 | A1 | 7/2003 | Evans et al. |
| 2003/0217006 | A1 | 11/2003 | Roever et al. |
| 2004/0133640 | A1* | 7/2004 | Yeager et al. ................ 709/204 |
| 2004/0199431 | A1 | 10/2004 | Ganesan et al. |
| 2005/0251452 | A1 | 11/2005 | Roever et al. |
| 2006/0075083 | A1 | 4/2006 | Liu |

OTHER PUBLICATIONS

No Author, "Secure P2P file sharing tool," (newspaper article), Aug. 9, 2004, 2 pages, The Hindu, Chennai, India.
Office Action having a mailing date of Jun. 2, 2006, issued by the Patent Office during prosecution of U.S. Appl. No. 10/954,930 previously submitted on Nov. 18, 2010.
Final Office Action having a mailing date of Jan. 24, 2007, issued by the Patent Office during prosecution of U.S. Appl. No. 10/954,930 previously submitted on Nov. 18, 2010.
Advisory Action having a mailing date of Apr. 5, 2007, issued by the Patent Office during prosecution of U.S. Appl. No. 10/954,930 previously submitted on Nov. 18, 2010.
Examiner's Answer having a mailing date of Oct. 4, 2007, issued by the Patent Office during prosecution of U.S. Appl. No. 10/954,930 previously submitted on Nov. 18, 2010.
Decision issued by the Board of Patent Appeals and Interferences having a mailing date of Nov. 26, 2008, issued by the Patent Office during prosecution of U.S. Appl. No. 10/954,930 previously submitted on Nov. 18, 2010.
Notice of Allowance having a mailing date of Mar. 25, 2009, issued by the Patent Office during prosecution of U.S. Appl. No. 10/954,930 previously submitted on Nov. 18, 2010.

* cited by examiner

*Primary Examiner* — Mila Airapetian
(74) *Attorney, Agent, or Firm* — Withrow & Terranova, PLLC (57)  ABSTRACT

At least two computer systems in a peer-to-peer network are utilized to support a secure transaction. Aspects of the present invention include allowing a shopper to create an order to purchase an item stored on a first computer system in the peer-to-peer network, and after the order is created, passing the order and control from the first computer system to a second computer system in the peer-to-peer network. The second computer system establishes a secure transaction session with the shopper, and then proceeds to process the order.

27 Claims, 8 Drawing Sheets

METHOD AND SYSTEM FOR SUPPORTING SECURE TRANSACTIONS IN A PEER-TO-PEER NETWORK

CROSS-REFERENCE TO RELATED APPLICATION

The present application is a continuation of U.S. patent application Ser. No. 10/954,930, filed on Sep. 30, 2004, the disclosure of which is hereby incorporated by reference in its entirety.

BACKGROUND OF THE INVENTION

1. Field of Invention

The present invention relates to peer-to-peer networks, and more particularly to a method and system for supporting secure transactions in a peer-to-peer network.

2. Description of the Related Art

Over the past several years, photosharing has become widely accepted by photo enthusiasts. Many websites currently exist that allow users to upload digital images to the website, where they are stored on a server and viewable by others over the Internet. Photosharing websites also allow a shopper to purchase digital images stored in the server, as well as other products based on the digital images, such as greeting cards, coffee mugs, mouse pads, and T-shirts, on which a selected image is imprinted.

This approach to photosharing and e-commerce, however, presents some disadvantages. In particular, users are required to upload digital images to the website, which can be time consuming, and the website requires extensive storage capacity to store the images of all the users, which can become expensive.

To address some of these concerns, the assignee of the present invention has developed a web-based peer-to-peer photosharing environment in which all workstations and computers (peers) in the network store images locally and act as servers to other users on the network. A central site accessible by all the peers provides additional functionality, such as coordinating the peers, providing search capabilities for the peers, purchase order fulfillment, etc.

Each peer computer includes a peer application, which when executed, enables the peer computer to communicate with other peers and with a server at the central site via a network, such as the Internet. The peer application also allows the user to perform operations locally, such as browsing thumbnail images and creating greeting cards with selected images.

While the peer-to-peer environment provides many advantages for photosharing, shopping in such an environment presents challenges. Each peer that wishes to sell products based on its digital assets must be equipped, at a minimum, to transmit digital assets selected by a shopper to the shopper, collect and authenticate the shopper's financial information, assure the shopper that it is authentic typically by providing a digital certificate, and securely manage the shopper's confidential information. Providing this capability can be expensive and can require significant resources. For example, procuring and maintaining a digital certificate alone can cost hundreds of dollars each year.

Accordingly, what is needed is an improved method and system for secure shopping in a peer-to-peer network. The present invention addresses such a need.

BRIEF SUMMARY OF THE INVENTION

The present invention provides a method and system for supporting a secure transaction in a peer-to-peer network. Aspects of the present invention include allowing a shopper to create an order to purchase one or more digital assets stored on a first computer system in the peer-to-peer network, and after the order is created, passing the order and control from the first computer system to a second computer system in the peer-to-peer network. The second computer system establishes a secure transaction session with the shopper, and then proceeds to process the order.

In another aspect of the present invention, after the second computer system establishes the secure transaction session, it invokes an asset upload web service on the first computer system and passes information related to the assets in the order it is processing. The asset upload web service receives the information and retrieves and uploads the assets to the second computer system.

DETAILED DESCRIPTION OF THE INVENTION

The present invention relates to peer-to-peer networks, and more particularly to a method and system for supporting a secure transaction in a peer-to-peer network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a method and system for supporting a secure transaction in a peer-to-peer network. In the present invention, first and second computer systems in a peer-to-peer network, in different locations and in different domains, cooperate to allow a shopper to perform a secure transaction over the Internet. The shopper can either be using one of the two computer systems or using a third computer system. In a preferred embodiment, the shopper chooses to purchase digital assets, e.g., images, stored in the first computer system and places the selected images in a shopping cart provided by the second computer system, which preferably is located at a central site accessible by all the peers. When the shopper is ready to complete the transaction, the shopper provides his or her authentication information and financial information to the second computer system after the second computer system has presented credentials verifying its authenticity to the shopper. The selected images are then uploaded from the first computer system to the second computer system where the shopper's order is fulfilled.

By utilizing the second computer system to provide a secure transaction environment for the shopper, secure transactional operations are centralized in one computer system, while the storing and sharing digital assets are distributed among the other peer computer systems in the peer-to-peer network. The second computer system maintains a secure transaction session with the shopper, who is assured that the entity that is receiving the shopper's confidential information is indeed authentic and capable of securely managing this sensitive information. Sensitive financial and authentication information for a shopper is stored in the second computer system so that the shopper is not required to provide such information to one or more peer computer systems, which may or may not be equipped to adequately protect the information. Meanwhile, the peer computer systems are free to concentrate only on storing and sharing images with other peers and guests.

Figure 1:
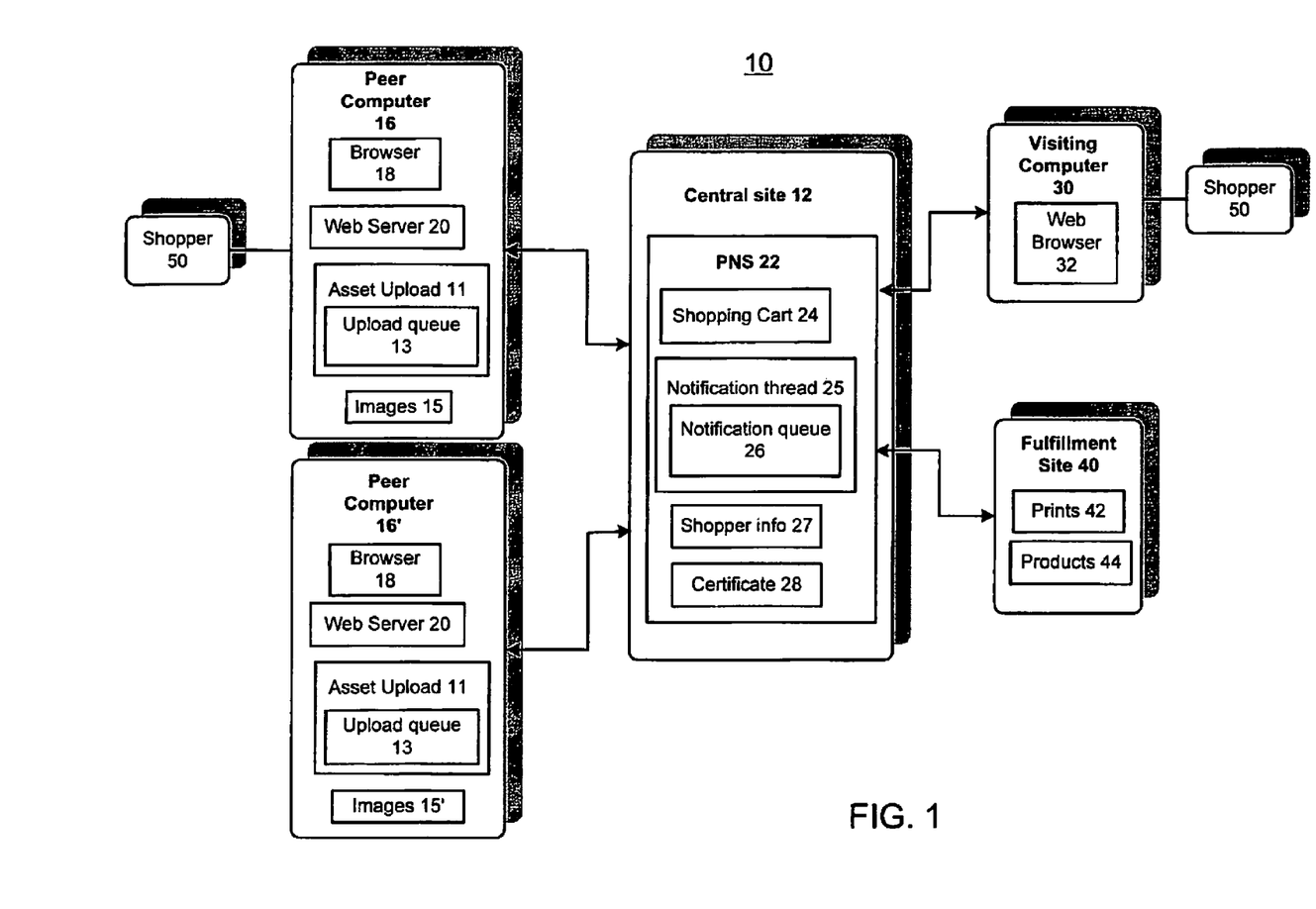
FIG. 1 is a block diagram illustrating a peer-to-peer (P2P) network in accordance with a preferred embodiment.

FIG. 1 is a block diagram illustrating a peer-to-peer (P2P) network in accordance with a preferred embodiment. According to the present invention, the network 10 includes a central site 12 and multiple peer computers 16, 16' (collectively referred to as peers 16). The central site 12 includes a peer network server (PNS) 22, which provides supporting services to the peers 16. Each peer 16, 16' includes a web browser 18, a web server 20 and images 15, 15'. In a preferred embodiment, a peer 16 uses its web browser 18 to communicate with its web server 20 and to communicate with the PNS 22 on the central site 12, via a network such as the Internet. In addition, the peers 16, 16' can communicate with one another via the central site 12 and can share their respective images 15, 15' with each other, as well as with a visiting computer 30, i.e., a computer that is not a member of the peer-to-peer network 10.

In a preferred embodiment, the web server 20 in the peer 16 and the PNS 22, are implemented using Model, View and Control (MVC) architecture. The MVC model is well known to those skilled in the art of website designing and generally partitions the model (i.e., data operations) from the view (i.e., display operations), and routes requests through a controller.

Figure 2:
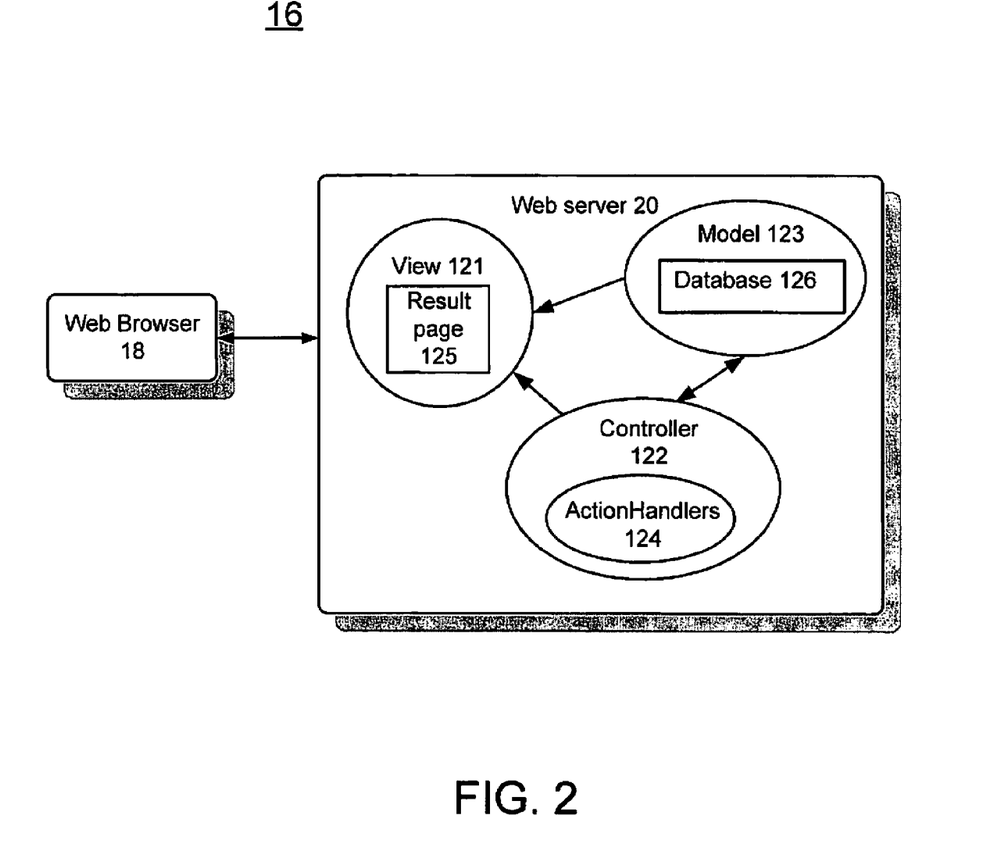
FIG. 2 is a block diagram illustrating the peer computer according to a preferred embodiment of the present invention.

FIG. 2 is a block diagram illustrating in more detail the peer computer 16 according to a preferred embodiment of the present invention, where similar components are identified by similar reference numerals. The web server 20 includes a view module 121, a model module 123 and a controller module 122. The view module 121 performs display operations, the model module 123 stores and organizes data in a database 126, and the controller module 122 performs user requested operations. The controller module 122 includes a plurality of action handlers 124, each of which is configured to perform a specific user operation.

In operation, the web browser 18 submits a request to the web server 20 to perform a user operation. The request is handled by the controller 122, which invokes the appropriate action handler 124 to perform the user operation. The action handler 124 performs the operation and stores the result in the model module 123. The controller module 122 initializes a result page 125 in the view module 121, which retrieves the result stored in the model module 123, and the view module 121 renders the result in the result page 125.

An action handler 124 can perform a user operation locally if all required resources are available on the peer 16. In addition, in a peer-to-peer network, an action handler 124 can perform a user operation that invokes a service residing in another computer system in the network, typically, the PNS 22. Under such circumstances, the action handler 124 passes control from the local peer 16 to the PNS 22, where the service is invoked.

According to the preferred embodiment of the present invention, action handlers 124 in the peer 16 interact with the PNS 22 to facilitate a secure transaction for purchasing images stored in the peer 16. In particular, the PNS 22 provides a shopping cart service 24 for allowing a shopper to select and place images into a virtual shopping cart, and action handlers that collect financial information for the shopper, process orders and notify shoppers about their orders.

Figure 3:
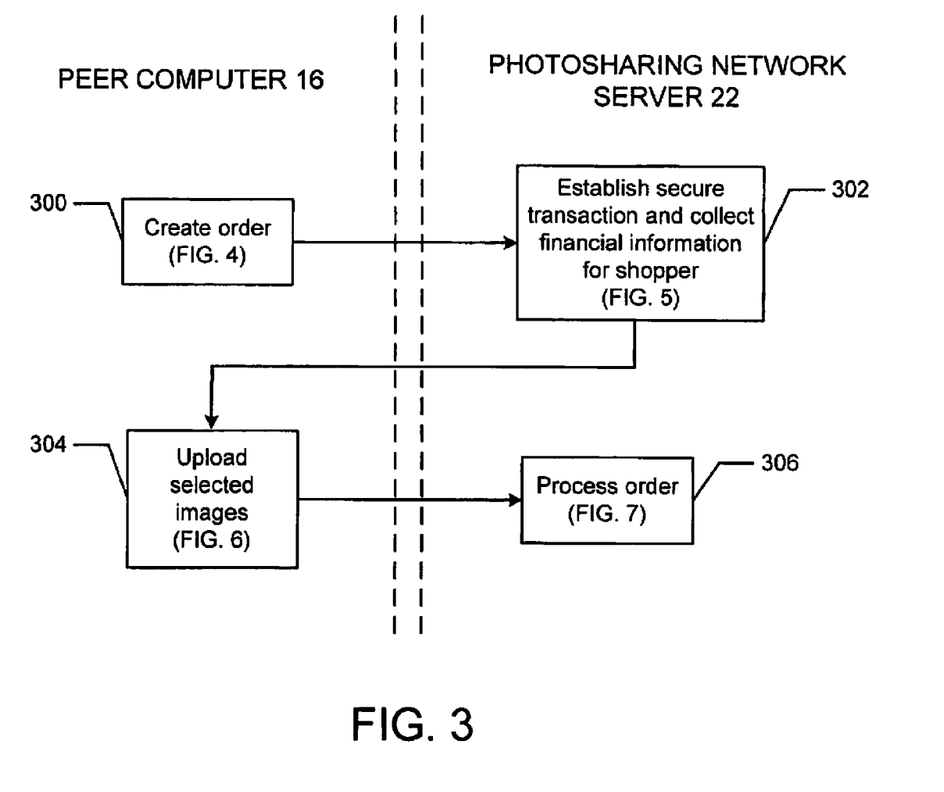
FIG. 3 is an overview flowchart illustrating a method for performing a secure transaction in a peer-to-peer network according to a preferred embodiment of the present invention.

FIG. 3 is an overview flowchart illustrating a method for performing a secure transaction in a peer-to-peer network according to a preferred embodiment of the present invention. Referring to FIG. 1 and FIG. 3, the process begins when a shopper 50 creates an order based on images 15 stored in a peer computer 16 (step 300). In a preferred embodiment, the shopper 50 can either be the peer owner 16 or a guest utilizing a visiting computer 30. In the later case, the visiting computer 30 accesses the images 15 in the peer computer 16 via the PNS 22.

According to the preferred embodiment of the present invention, when the shopper 50 is ready to complete the order, the peer 16 passes control to the PNS 22, which calls an action handler to establish a secure transaction session and to collect the shopper's financial information (step 302). The PNS 22 then invokes an image upload service 11 in the peer 16 and passes control back to the peer 16, which uploads the selected images 15 to the PNS 22 (step 304). Once the selected images 15 are uploaded, the peer 16 passes control back to the PNS 22, which calls another action handler to process the order (step 306).

Figure 4:
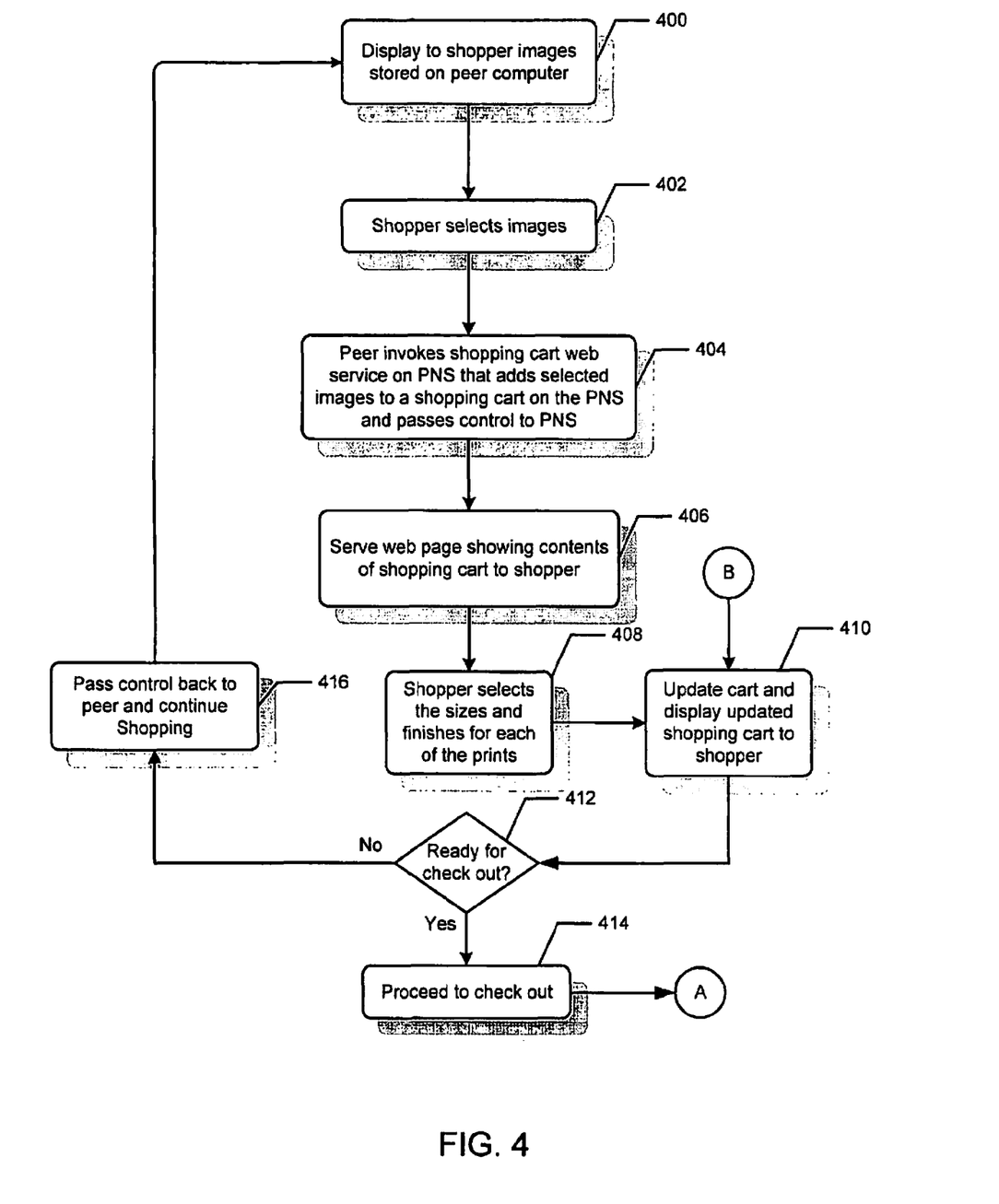
FIG. 4 is a flowchart illustrating a method for creating an order for images stored in a peer computer according to a preferred embodiment of the present invention.

Each step (300-306) of the secure transaction process is described in more detail with reference to the following FIGS. 4-7. FIG. 4 is a flowchart illustrating a method for creating an order for images 15 stored in a peer computer 16 (step 300) according to a preferred embodiment of the present invention. Referring again to FIG. 1, FIG. 2 and FIG. 4, the process begins by displaying to the shopper 50 images 15 stored on the peer computer 16 (step 400). In a preferred embodiment, the web browser 18 displays a page 125 that includes thumbnails of the images 15. From this page 125, the shopper 50 is allowed to select one or more images 15 (step 402).

When images 15 are selected, an action handler 124 in the peer computer 16 invokes a shopping cart web service in the PNS 22 that allows the shopper 50 to add the selected images 15 to a shopping cart 24 (step 404) and passes control to the PNS 22. In a preferred embodiment, pointers associated with each selected image 15 are transmitted to the PNS 22 and the full resolution images 16 remain on the peer 16.

After the selected images 15 have been added to the shopping cart 24, the PNS 22 serves a web page to the browser 20 displaying the contents of the shopping cart 24 to the shopper 50 (step 406). The shopper 50 is allowed to select the size, quantity, and finish for each image (step 408), or to modify the contents of the shopping cart 24, e.g., by deleting one or more images 15. In response, the PNS 22 updates the shopping cart 24 and displays the updated shopping cart 24 to the shopper 50 (step 410).

If the shopper 50 is finished creating the order and is ready for check out (step 412), the PNS 22 proceeds to a check out process (step 414), e.g., establishing a secure transaction session and collecting financial information for the shopper 50. Otherwise, if the shopper 50 is not ready for check out, the PNS 22 passes control back to the peer 16 and the shopper 50 continues shopping (step 416), i.e., steps 400-412 are repeated.

Figure 5:
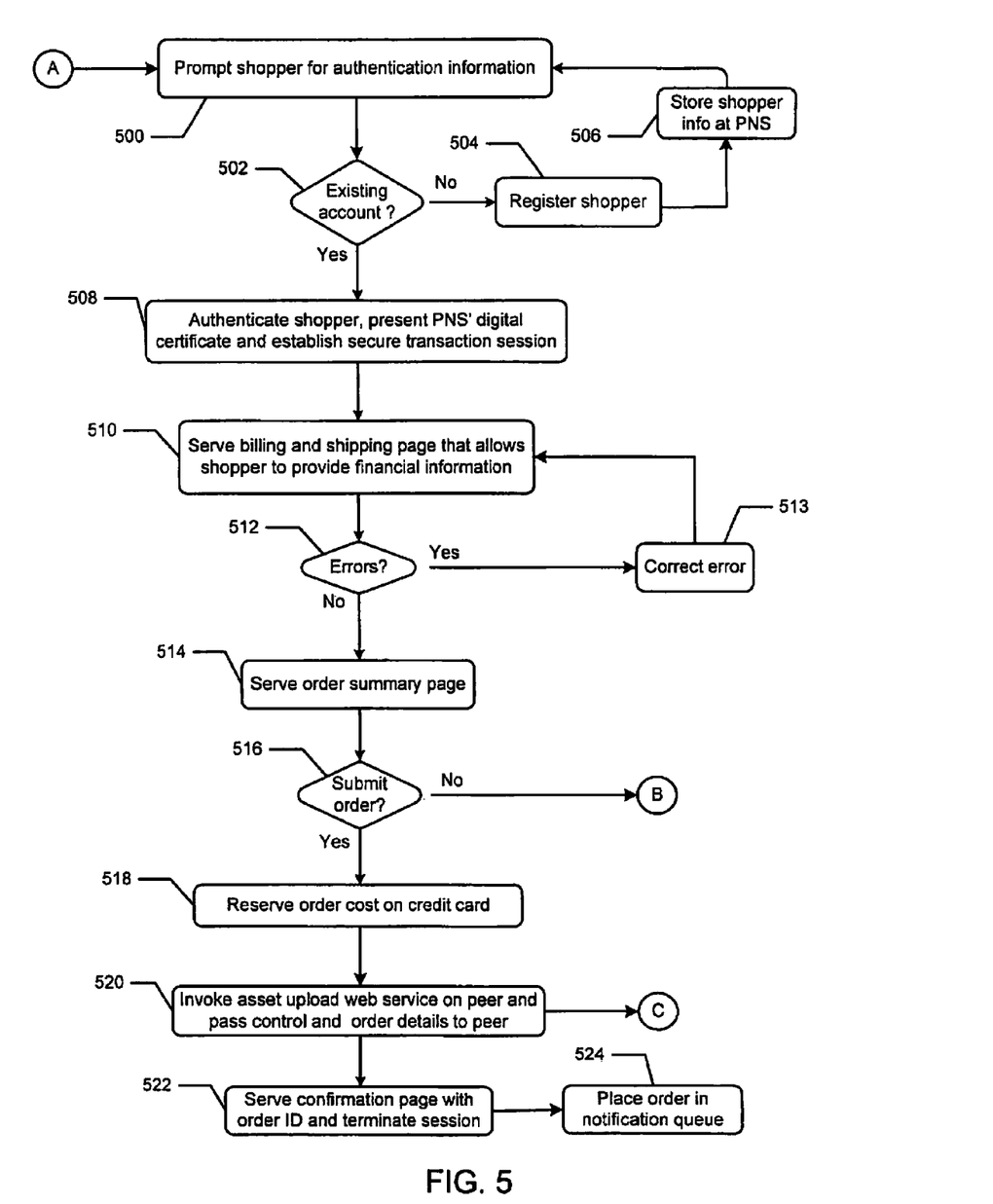
FIG. 5 is a flowchart illustrating a process for initiating a secure transaction session and collecting a shopper's financial information by a peer network server according to a preferred embodiment of the present invention.

FIG. 5 is a flowchart illustrating the process for establishing the secure transaction session and collecting the shopper's information by the peer network server 22 according to a preferred embodiment of the present invention. Referring to FIG. 1, FIG. 2 and FIG. 5, when the shopper is ready to check out, the PNS 22 serves a log-on page to the shopper 50, which prompts the shopper 50 for authentication information (step 500). In a preferred embodiment, the shopper 50 is requested to enter a userID and a password. If the shopper 50 does not have an account with the PNS 22 (step 502), i.e., the shopper 50 has not registered with the PNS 22, the shopper 50 is asked to register (step 504) by providing authentication information and other shopper information. The shopper's information 27, including the authentication information, is stored in the PNS 22 (step 506) and steps 500-502 are repeated.

Once the shopper 50 is registered, i.e., the shopper 50 has an existing account, and submits authentication information (step 500), the PNS 22 authenticates the shopper 50, presents its digital certificate 28 to assure the shopper 50 that the PNS 22 is authentic, and establishes a secure transaction session between the shopper's computer 16, 30 and the PNS 22 (step 508). The establishment of the secure transaction session is well known to those skilled in the art and can be performed in a number of ways.

After the secure transaction session is established, the PNS 22 serves a billing and shipping page that allows the shopper 50 to provide financial information (step 510), such as a credit card number, and a billing address. In a preferred embodiment, the shopper 50 is allowed to store his or her financial information in the PNS 22, so that for future transactions, the shopper can choose to automatically populate the billing and shipping page with the shopper's stored financial information and billing address.

The PNS 22 checks the billing and shipping page for any errors. For example, an error might include omitting the shopper's zip code or phone number. If an error is found (step 512), the shopper 50 prompted to correct the error (step 513). If the billing and shipping page is error free, the PNS 22 serves an order summary page to the shopper 50 (step 514). In the preferred embodiment, the order summary page shows the total cost of the order, including shipping and taxes, and a detailed description of the items in the shopping cart being purchased. The order summary page allows the shopper 50 to submit the order if the shopper 50 is ready.

If the shopper 50 is not ready to submit the order (step 516), for example because the shopper 50 wants to delete items from the shopping cart 24, the PNS 22 allows the shopper 50 to update the cart (step 410, FIG. 4). If the shopper 50 is ready to submit the order, the PNS 22 reserves on the shopper's credit cart an amount equal to the cost of the order (step 518), but does not yet debit the credit card.

The PNS 22 then invokes an asset upload web service 11 on the peer 16 and passes control to the peer 16 along with order details, e.g., the identifier to each image 15 selected by the shopper 50, for the order (step 520). The functionality of the asset upload web service 11 is described below with reference to FIG. 6.

After control and the order details have been passed to the peer 16, the PNS 22 independently serves a confirmation page to the shopper 50 that preferably informs the shopper 50 that the order has been submitted, provides an order identifier for tracking and identification purposes, and terminates the secure transaction session (step 522). The PNS 22 then places the order in a notification queue 26 (step 524) for later use (described below).

Figure 6:
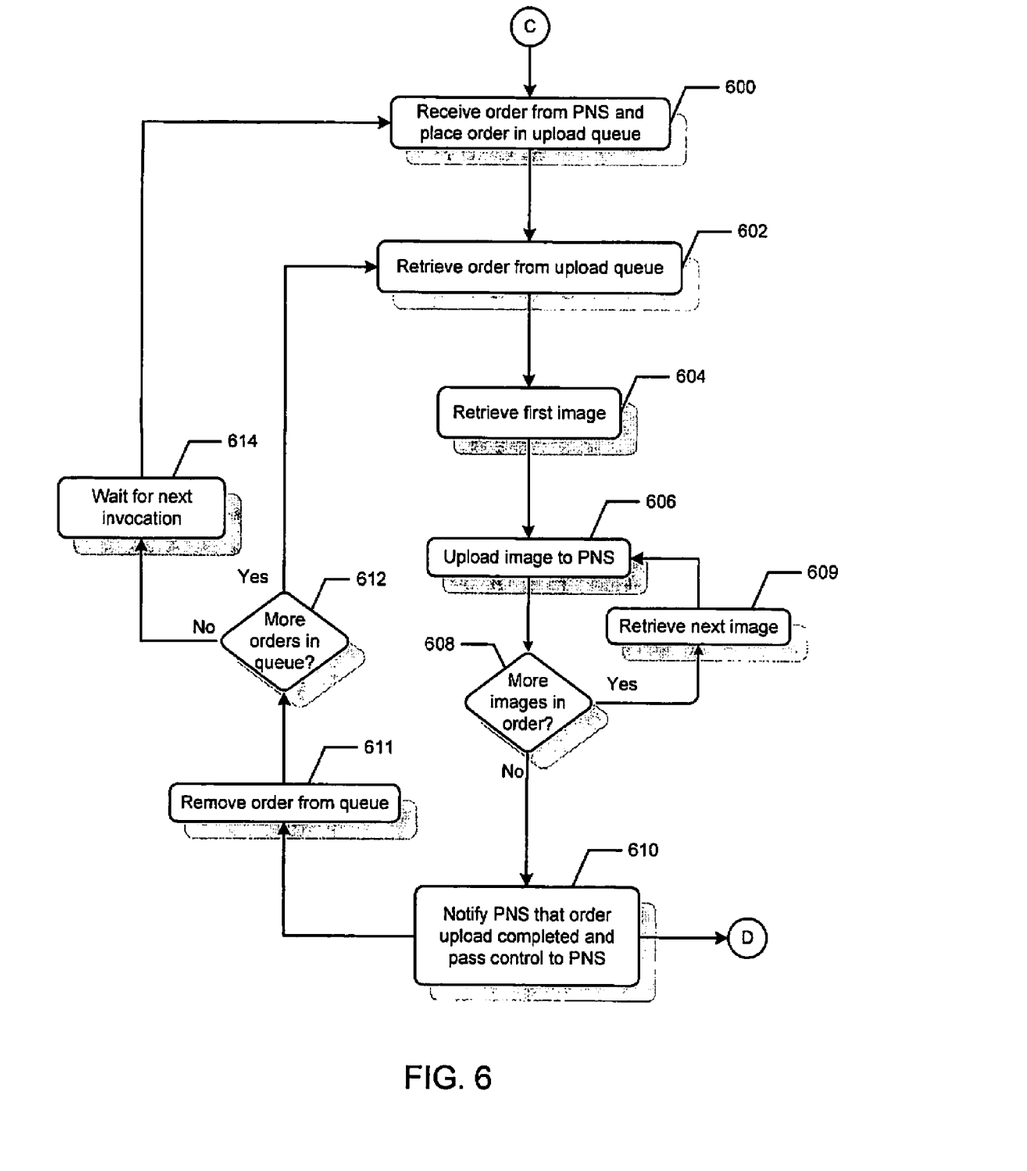
FIG. 6 is a flowchart illustrating a process for uploading selected images from the peer computer to the peer network server according to a preferred embodiment of the present invention.

FIG. 6 is a flowchart illustrating the process for uploading images 15 from the peer 16 to the PNS 22 according to a preferred embodiment of the present invention. This process is preferably performed by the asset upload web service 11 on the peer 16 when it is invoked by the PNS 22, e.g., step 520 (FIG. 5). Referring to FIG. 1 and FIG. 6, when the peer 16 receives order details for an order from the PNS 22, it places the order details in an upload queue 13 (step 600). This is necessary particularly when the images 15 for another order are being uploaded when the order details for the present order are received.

Eventually, the image upload service 11 retrieves the order from the upload queue 13 (step 602), and retrieves a first image 15 for the order (step 604). The image 15 is uploaded to the PNS 22 (step 606) and if more images are in the order (step 608), they too are retrieved individually (step 609) and uploaded to the PNS 22 (step 606).

When all images 15 in the order have been uploaded, the asset upload service 11 notifies the PNS 22 that the order upload is completed and passes control to the PNS 22 (step 610). The asset image upload web service 11 then removes the order from the upload queue 13 (step 611), and if more orders are in the upload queue 13 (step 612), the image upload web service 11 repeats steps 602-610. When the upload queue 13 is empty, the image upload web service 11 waits to be invoked again by the PNS 22 (step 614).

As stated above, after all of the images 15 in an order have been uploaded to the PNS 22, the peer 16 notifies the PNS 22 that the upload is completed and passes control to the PNS 22 (step 610). When the PNS 22 receives this notification, the PNS 22 continues to process the order.

Figure 7:
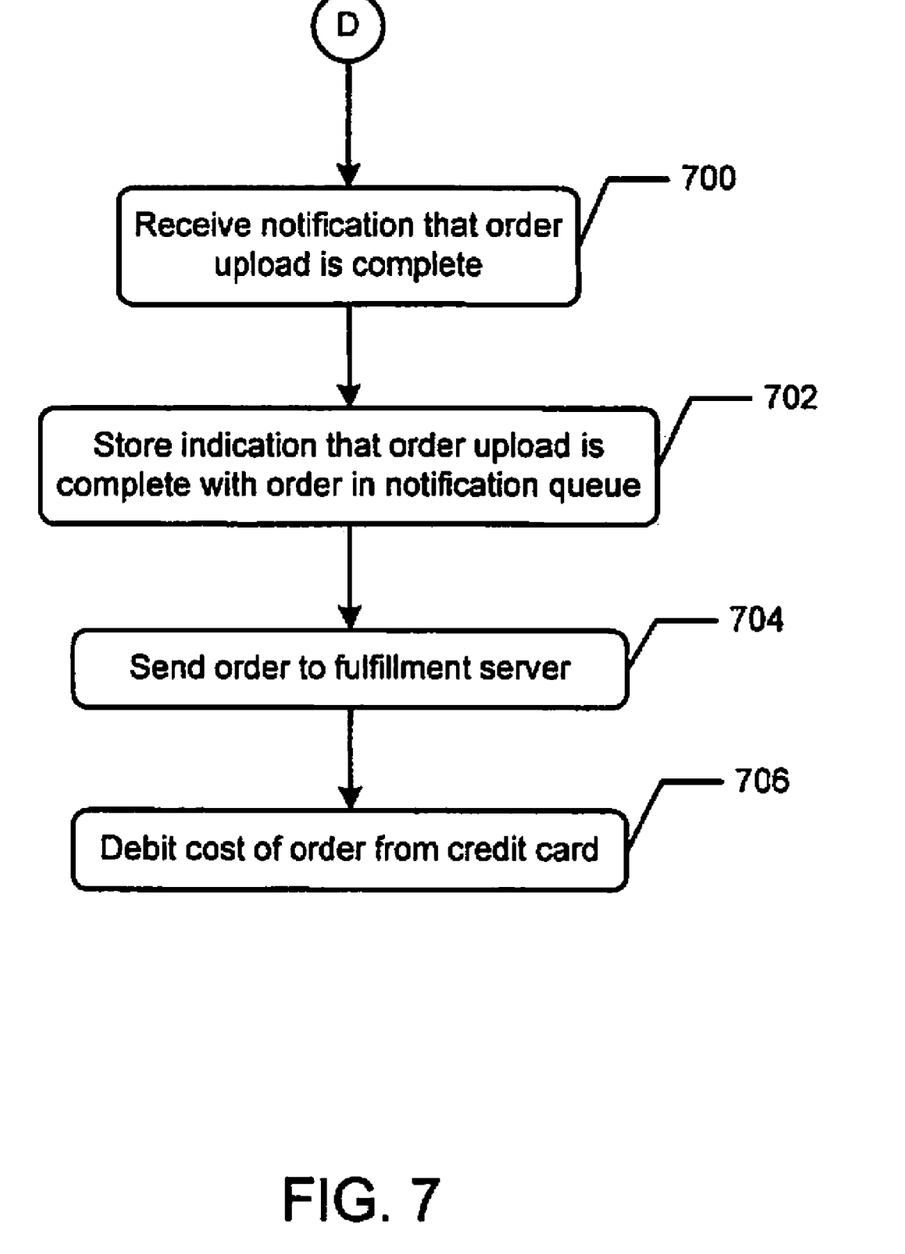
FIG. 7 is a flowchart illustrating a method for processing the order in the peer network server according to a preferred embodiment of the present invention.

FIG. 7 is a flowchart illustrating a method for processing the order in the PNS 22 after the images have been uploaded according to a preferred embodiment of the present invention. Referring again to FIG. 1 and FIG. 7, the PNS 22 receives the notification from the peer 16 that the order upload is complete (step 700). As stated above, the PNS 22 stores the order in the notification queue 26 after the shopper 50 submits the order (step 516, FIG. 5). After the PNS 22 receives the notification, the PNS 22 stores an indicator that the order upload for the order has been completed with the order in the notification queue 26 (step 702). For example, the indicator can be a flag associated with the order in the queue 26. The indicator is utilized by the PNS 22 to perform a notification function that will be described below with respect to FIG. 8.

When all of the images 15 in the order have been uploaded, the PNS 22 transmits the order along with the images 15 to a fulfillment site 40 for completing the order (step 704), e.g., creating prints 42 of the images 15 or creating a product 44, such as a greeting card, based on the images 15. The PNS 22 now debits the shopper's credit card for the cost of the order (step 706).

As indicated above, in a preferred embodiment, the PNS 22 also performs a notification function, which is performed by a notification thread 25. The notification thread 25 automatically runs at given time intervals and provides information to the shopper 50 about pending order(s).

Figure 8:
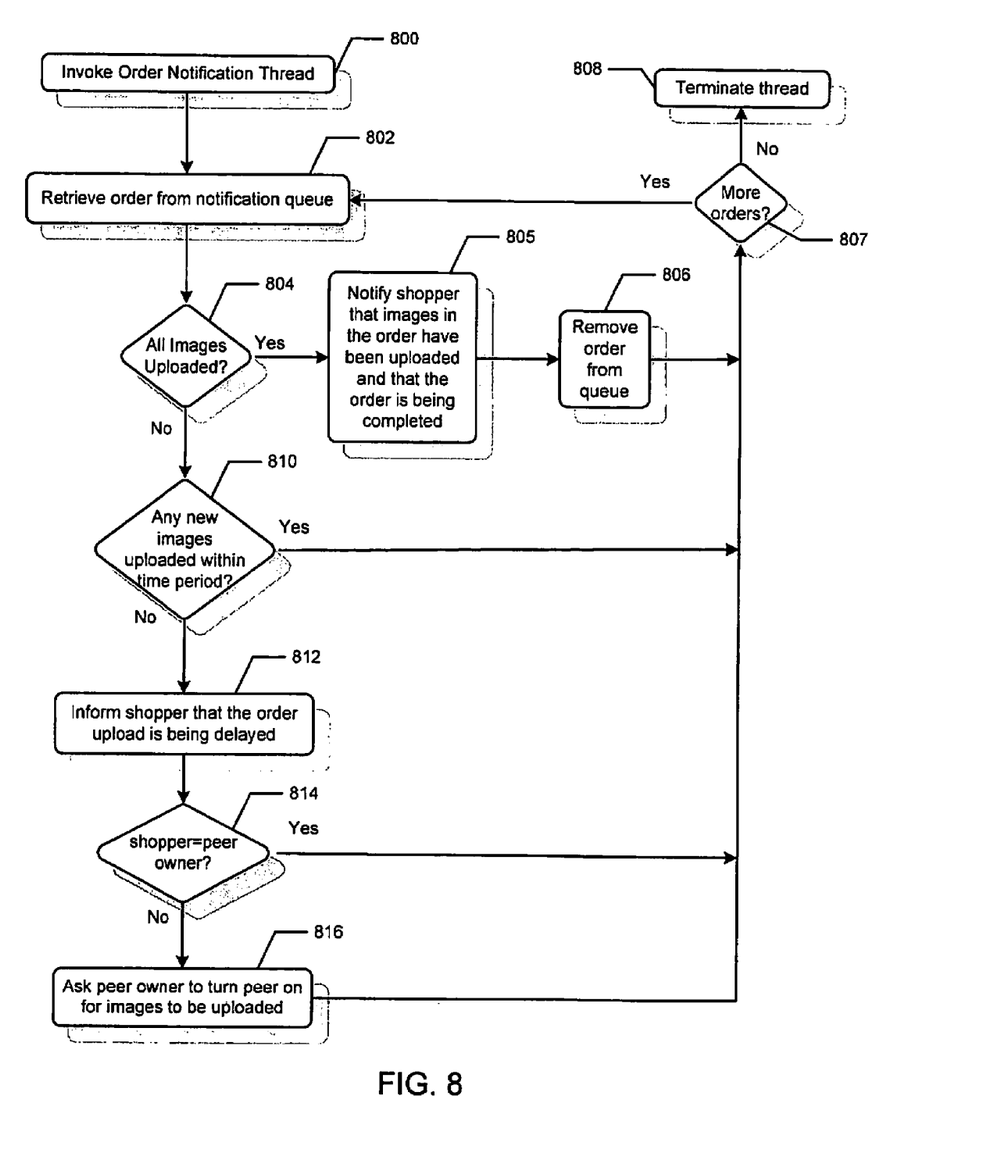
FIG. 8 is a flowchart illustrating a process for notifying a shopper about the order by the peer network server according to a preferred embodiment of the present invention.

FIG. 8 is a flowchart illustrating a process for notifying a shopper about the order by the PNS 22 according to a preferred embodiment of the present invention. Referring again to FIG. 1 and FIG. 8, the process begins when the notification thread 25 in the PNS 22 is invoked (step 800). Once invoked, the notification thread 25 retrieves an order from the notification queue 26 (step 802), and determines whether all the images 15 in the order have been uploaded from the peer 16 to the PNS 22 (step 804), i.e., whether the upload order for the order has been completed. For example, the notification thread 25 checks for the indicator associated with the order, and if the indicator is not present, the notification thread 25 concludes that the upload order is not complete.

If all of the images 15 in the order have been uploaded to the PNS 22 (step 804), the notification thread 25 notifies the shopper 50 that the images 15 in the order have been uploaded and that the order is being completed (step 805). The notification thread 25 then removes the order from the queue 26 (step 806). If more orders are in the queue (step 807), the notification thread 25 repeats the process for the next order (step 802 et seq.). Otherwise, the notification thread 25 terminates (step 808).

If all of the images 15 in the order have not been uploaded (step 804), then the notification thread 25 determines whether any new images 15 have been uploaded during a predetermined time period (step 810). If no new images have been uploaded, the notification thread 25 informs the shopper 50 that the order upload has been delayed (step 812), for example because the peer 16 has been turned off. If new images 15 have been uploaded, the notification thread 25 moves on the next order, if one exists (step 807), and repeats the process starting at step 802. By determining whether any new images 15 have been uploaded during the time period (step 810), the notification thread 25 avoids sending a delay message to the shopper 50 if the number of images 15 that are being uploaded is so large that the time required for completing the uploading process exceeds one or more cycles of the notification thread 25.

As stated above, if the order upload has been delayed, the notification thread 25 sends a message to the shopper 50 indicating that the order upload is being delayed (step 812). In addition, the notification thread 25 determines whether the shopper 50 is the peer owner (step 814). If the shopper 50 is not the peer owner, i.e., the shopper 50 is a guest utilizing another peer 16' or a visiting computer 30, then the notification thread 25 asks the peer owner to turn the peer 16 on in order for the images 15 to be uploaded (step 816). Otherwise, the notification thread 25 moves on the next order, if one exists (step 807), and repeats the process starting at step 802.

The present invention provides a method and system for supporting a secure transaction in a peer-to-peer network. In a preferred embodiment, first and second computer systems in a peer-to-peer network, in different locations and in different domains, cooperate to facilitate a secure transaction based on digital assets, e.g., images, stored in the first computer system. The second computer system is utilized to provide a shopping cart for a shopper and to establish a secure transaction session during which the shopper provides financial information. The first computer system uploads images selected by the shopper to the second computer system, which then processes shopper's order and notifies the shopper when the order is being completed.

By utilizing the second computer system to host the shopping cart service and to provide a secure transaction environment with the shopper, transactional operations are centralized. Sensitive financial and authentication information for a shopper is stored in a central computer system, i.e., the second computer system, so that the shopper is not required to register with one or more peers computer systems, which may or may not be equipped to adequately protect the information. The first computer system, typically a peer computer system, is free to concentrate only on storing and sharing images with other peers and guests.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method of centralizing secure transactions in a peer-to-peer network comprising:

receiving at a peer network server in the peer-to-peer network an order to purchase an item stored on a first computer system in the peer-to-peer network, where a shopper communicating with the first computer system created the order;

receiving control of processing the order from the first computer system at the peer network server;

establishing a secure transaction session between the peer network server and the shopper; and processing the order.

2. The method of claim 1, wherein the item is based on a digital asset.

3. The method of claim 2, wherein the digital asset is at least one of a digital image, a song, or a video.

4. The method of claim 2, wherein a product is created with the digital asset.

5. The method of claim 1, wherein establishing the secure transaction session includes authenticating the shopper and presenting to the shopper a certificate verifying the authenticity of the peer network server.

6. The method of claim 1 further including after establishing the secure transaction session, collecting, by the peer network server, information associated with the shopper, wherein the information associated with the shopper includes a credit card number associated with the shopper and a billing address associated with the shopper.

7. The method of claim 1 further including providing an asset upload web service on the first computer system for uploading the item from the first computer system to the peer network server.

8. The method of claim 7, wherein processing the order includes invoking the upload web service by the peer network server and passing control of processing the order and order details to the upload web service, wherein the order details include information related to the item in the order.

9. The method of claim 8 wherein processing the order further includes retrieving and uploading the item in the order from the first computer system to the peer network server.

10. A computer readable medium containing program instructions for centralizing secure transactions in a peer-to-peer network comprising instructions for:
- at a peer network server communicating with peers in the peer-to-peer network,
- i) receiving an order to purchase an item stored on a first computer system in the peer-to-peer network, where a shopper communicating with the first computer system created the order;
- ii) receiving control of processing the order from the first computer system;
- iii) establishing a secure transaction session between the peer network server and the shopper; and
- iv) processing the order.

11. The computer readable medium of claim 10, wherein the item is based on a digital asset.

12. The computer readable medium of claim 11, wherein the digital asset is at least one of a digital image, a song, or a video.

13. The computer readable medium of claim 11, wherein a product is created with the digital asset.

14. The computer readable medium of claim 10, wherein establishing the secure transaction session includes authenticating the shopper and presenting to the shopper a certificate verifying the authenticity of the peer network server.

15. The computer readable medium of claim 10 further including after establishing the secure transaction session, collecting, by the peer network server, information associated with the shopper, wherein the information associated with the shopper includes a credit card number associated with the shopper and a billing address associated with the shopper.

16. The computer readable medium of claim 10 further including providing an asset upload web service on the first computer system for uploading the item from the first computer system to the peer network server.

17. The computer readable medium of claim 16, wherein processing the order includes invoking the upload web service by the peer network server and passing control of processing the order and order details to the upload web service, wherein the order details include information related to the item in the order.

18. The computer readable medium of claim 17 wherein processing the order further includes retrieving and uploading the item in the order from the first computer system to the peer network server.

19. A peer network server for communicating with peers in a peer-to-peer network, the peer network server comprising:
- memory; and
- a processor in communication with the memory configured to:
- i) receive an order to purchase an item stored on a first computer system in the peer-to-peer network, where a shopper communicating with the first computer system created the order;
- ii) receive control of processing the order from the first computer system;
- iii) establish a secure transaction between the peer network server and the shopper; and
- iv) process the order.

20. The peer network server of claim 19, wherein the item is based on a digital asset.

21. The peer network server of claim 20, wherein the digital asset is at least one of a digital image, a song, or a video.

22. The peer network server of claim 20, wherein a product is created with the digital asset.

23. The peer network server of claim 19, wherein establishing the secure transaction session includes authenticating the shopper and presenting to the shopper a certificate verifying the authenticity of the peer network server.

24. The peer network server of claim 19 further including after establishing the secure transaction session, collecting, by the peer network server, information associated with the shopper, wherein the information associated with the shopper includes a credit card number associated with the shopper and a billing address associated with the shopper.

25. The peer network server of claim 19 further including providing an asset upload web service on the first computer system for uploading the item from the first computer system to the peer network server.

26. The peer network server of claim 25, wherein processing the order includes invoking the upload web service by the peer network server and passing control of processing the order and order details to the upload web service, wherein the order details include information related to the item in the order.

27. The peer network server of claim 26 wherein processing the order further includes retrieving and uploading the item in the order from the first computer system to the peer network server.

* * * * *